United States Patent [19]
Urino

[11] Patent Number: 6,134,361
[45] Date of Patent: Oct. 17, 2000

[54] OPTICAL MULTIPLEXER/DEMULTIPLEXER

[75] Inventor: Yutaka Urino, Tokyo, Japan

[73] Assignee: NEC Corporation, Tokyo, Japan

[21] Appl. No.: 09/098,453

[22] Filed: Jun. 17, 1998

[30] Foreign Application Priority Data

Jun. 18, 1997 [JP] Japan .................................. 9-161670

[51] Int. Cl.[7] .................................................. G02B 6/26
[52] U.S. Cl. .............................. 385/42; 385/31; 385/33; 385/32; 385/37; 385/39; 385/38; 359/115
[58] Field of Search ............................ 385/42, 31, 33, 385/32, 37, 39, 38; 359/115, 116, 117

[56] References Cited

U.S. PATENT DOCUMENTS

| | | | |
|---|---|---|---|
| 4,652,076 | 3/1987 | Unger ...................................... | 359/115 |
| 4,834,481 | 5/1989 | Lawsin et al. ......................... | 359/115 |
| 5,832,154 | 11/1998 | Uetsuka et al. ........................ | 387/33 |
| 5,859,941 | 1/1999 | Horita et al. ............................ | 385/37 |

FOREIGN PATENT DOCUMENTS

| | | |
|---|---|---|
| 3-2806 | 1/1991 | Japan . |
| 4-212108 | 8/1992 | Japan . |

OTHER PUBLICATIONS

Norio Takato et al., "Silica–Based Single–Mode Waveguides on Silicon and their Application to Guided–Wave Optical Interferometers", *Journal of Lightwave Technology*, vol. 6, No. 6, Jun. 1988, pp. 1003–1010.

Toshimi Kominato et al., "Guide–Wave Optical WDM Circuits with Mach–Zehnder Interferometer Configuration", *Electron Information Transmission Journal C–I*, vol. J73–C–I, No. 5, 1990, pp. 354–359.

*Primary Examiner*—Cassandra Spyrou
*Assistant Examiner*—Mohammad Y. Sikder
*Attorney, Agent, or Firm*—Sughrue, Mion, Zinn, Macpeak & Seas, PLLC

[57] ABSTRACT

The present invention is related to an optical multiplexer/demultiplexer that has a wide wavelength passing band. This optical multiplexer/demultiplexer includes a substrate formed from a material with a uniform refractive index, a first and a second waveguide which are mounted to the substrate and are formed from a material with a refractive index higher than the substrate, and a directional coupler that is formed by placing each portions the first and second waveguides in close proximity to each other at a preselected length. Each of the portions of the first and second waveguides which are in close proximity are bisected into an upper region and a lower region in the one direction the light waves propagate. The propagation constant of the upper region of the first waveguide is set to be higher than the other portion and the propagation constant of the lower region of the second waveguide is set to be higher than the other portion. This allows expansion of the wavelength passing band.

24 Claims, 8 Drawing Sheets

(A)

(B)

(C)

(A)

(B)

(A)

(B)

(A)

(B)

OPTICAL MULTIPLEXER/DEMULTIPLEXER

BACKGROUND OF THE INVENTION

1. Field of the Invention

The present invention relates to an optical multiplexer/demultiplexer that uses a waveguide to multiplex a light wave of a plurality of wavelengths into a light wave of a single wavelength or demultiplex a light wave of a single wavelength into a light wave of a plurality of wavelengths.

2. Description of the Related Art

In recent years, formats have been proposed which simultaneously transmit telephone signals at a wavelength of 1.3 [μm] together with CATV and various information signals at a wavelength of 1.55 [μm] using one optical fiber.

Research and development have been proceeding directed towards the realization of this technology. An optical multiplexer/demultiplexer multiplexes and demultiplexes optical signals in response to their wavelengths. For example, when carrying out the above-mentioned optical transmission and reception, an optical multiplexer/demultiplexer is used in order to multiplex an optical signal with a wavelength band of 1.3 [μm] and an optical signal with a wavelength band of 1.55 [μm] or demultiplex an optical signal that was multiplexed.

For the composition of an optical multiplexer/demultiplexer, devices which combine elements, fiber types, and waveguide types are known.

An optical multiplexer/demultiplexer that combines elements comprises elements which spatially divide light waves according to their wavelengths by prisms, diffraction gratings or interference membrane filters and elements which convert the optical paths of mirrors, lenses and other similar devices.

This optical multiplexer/demultiplexer has problems such as difficulties in size reduction due to a complex composition, high assembly and adjustment costs, and low tolerance to heat and shocks.

A fiber type optical multiplexer/demultiplexer combines an optical brancher and a directional coupler which are produce[dB]y fusing two or more optical fibers. Further, in a fiber type optical multiplexer/demultiplexer, a grating mirror is formed within the optical fiber.

This type of optical multiplexer/demultiplexer has problems such as in size reduction as well as difficulties in setting the target wavelength.

A waveguide type optical multiplexer/demultiplexer is comprised by directional couplers and Mach-Zehnder interferometers formed within the substrate or on the substrate by means of waveguides. This optical multiplexer/demultiplexer has great freedom in wavelength selectivity in the design. Further, this optical multiplexer/demultiplexer has advantageous of small size and uniform characteristics leading to low-cost manufacture due to the fact that is uses micro-machining technology like as ICs production.

As a conventional example of this type of optical multiplexer/demultiplexer, for example, directional couplers and Mach-Zehnder interferometers have been published in the Electron Information Transmission Journal C-I, Vol. J73-C-I, No. 5, p354–359, 1990.

FIG. 9 is a top view showing a waveguide type optical multiplexer/demultiplexer 50 comprised by the above-mentioned directional coupler published in the Electron Information Transmission Journal.

A first waveguide 53 and a second waveguide 54 are formed on a substrate 51. This first waveguide 53 and second waveguide 54 are in close proximity to each other at the mid-point of the substrate 51. This portion that is in close proximity constitutes a directional coupler 52. The coupling length (length of the portion that is in close proximity of each waveguide 53, 54) of this directional coupler 52 becomes equal to an odd number multiple of the minimum perfect coupling length (the minimum coupling length when light output from a waveguide is admitted and is completely transferred to the other waveguide) for a certain wavelength $\lambda_1$. The coupling length is further set such that it becomes equal to an odd number multiple of the minimum coupling length for a separate wavelength $\lambda_2$. Because of this, an optical signal of wavelength $\lambda_1$ admitted into the first waveguide 53 will output from the second waveguide 54. Further, an optical signal of wavelength $\lambda_2$ admitted into the second waveguide 54 will also output from the second waveguide 54. By this function, each optical signal of wavelength $\lambda_1$ and wavelength $\lambda_2$ are multiplexed.

Even further, an optical signal of wavelength $\lambda_1$ admitted into the first waveguide 53 will output from the second waveguide 54. Further, an optical signal of wavelength $\lambda_2$ admitted into the first waveguide 53 will output from the first waveguide 53. By this function, each optical signal of wavelength $\lambda_1$ and wavelength $\lambda_2$ which were multiplexed are demultiplexed.

FIG. 10 is a top view showing a Mach-Zehnder interferometer type optical multiplexer/demultiplexer 60 as published in the above-mentioned Electron Information Transmission Journal.

A first waveguide 63 and a second waveguide 64 are formed on a substrate 61. This first waveguide 63 and second waveguide 64 come into close proximity to each other at two locations within their paths. These portions which are in close proximity form a first 3 [dB] coupler 65 and a second 3 [dB] coupler 66. This first waveguide 63 and second waveguide 64 are set such that a fixed difference in the optical path occur at the portion sandwiched between the first 3 [dB] coupler 65 and the second 3 [dB] coupler 66. This fixed difference in the optical path becomes an integral number multiple of $\lambda_1$ for a certain wavelength $\lambda_1$. This fixed difference in the optical path is further set such that it becomes a half-integral number multiple of $\lambda_2$ for a separate wavelength $\lambda_2$.

Because of this, an optical signal of wavelength $\lambda_1$ admitted into the first waveguide 63 will output from the second waveguide 64. Further, an optical signal of wavelength $\lambda_2$ admitted into the second waveguide 64 will also output from the second waveguide 64. By this function, each optical signal of wavelength $\lambda_1$ and wavelength $\lambda_2$ are multiplexed.

Even further, an optical signal of wavelength $\lambda_1$ admitted into the first waveguide 13 will output from the second waveguide 14. Further, an optical signal of wavelength $\lambda_2$ admitted into the first waveguide 13 will output from the first waveguide 13. By this function, each optical signal of wavelength $\lambda_1$ and wavelength $\lambda_2$ which were multiplexed are demultiplexed.

The following problems are present in the conventional directional coupler type optical multiplexer/demultiplexer 50 shown in FIG. 9.

The first problem is that because the properties of the directional coupler 52 are extremely sensitive to variations in the wavelength, the wavelength band of the optical signal that can pass through the coupler narrows making it impossible to include many wavelengths within the wavelength passing band.

The second problem is that because the properties of the directional coupler 52 are extremely sensitive to element parameters of the coupler portions, the allowable production errors of the coupler portions grow smaller in number making it difficult to stably produce elements with low crosstalk between the wavelengths.

Moreover, the following problems are present in the Mach-Zehnder interferometer type optical multiplexer/demultiplexer shown in FIG. 10.

The first problem is that because there is a wavelength dependency on the branching ratio of the directional coupler used as the 3 [dB] couplers 65, 66, it is difficult to design a multiplexer/demultiplexer that corresponds to a wide wavelength band.

The second problem is that because it is necessary to separate the two 3 [dB] couplers 65, 66 by a certain distance in order than coupling does not occur, the length of the waveguide almost doubles compared to a directional coupler and the size of the elements increases compared to a directional coupler.

SUMMARY OF THE INVENTION

An object of the present invention is to widen the wavelength passing band of an optical multiplexer/demultiplexer.

Another object of the present invention is to make it possible to obtain more allowable production errors of an optical multiplexer/demultiplexer.

A further object of the present invention is to reduce the size of an optical multiplexer/demultiplexer.

Thereupon, the present invention comprises a substrate formed from a material with a uniform refractive index, a first and a second waveguide which are mounted to the substrate and are formed from a material with a refractive index higher than the substrate, and a directional coupler that is formed by placing each portions of the first and second waveguides in close proximity to each other at a preselected length.

Further, each of the portions of the first and second waveguides are bisected into an upper region and a lower region in the one direction the light waves propagate. The propagation constant of the upper region of the first waveguide is set to be higher than the other portion and the propagation constant of the lower region of the second waveguide is set to be higher than the other portion. Even further, in concrete terms, given L is length of the portions which are in close proximity, $2 \cdot \Delta(\lambda)$ ($[2 \cdot \Delta(\lambda)]$ means $2 \times \Delta(\lambda)$) is the propagation constant difference between the portion of the upper region of the first waveguide and other portions of the first waveguide, $2 \cdot \Delta(\lambda)$ is also the propagation constant difference between the portion of the lower region of the first waveguide and other portions of the second waveguide, and $\kappa(\lambda)$ is the coupling coefficient of the first and the second waveguides, then $\lambda$ is defined as the wavelength of the incident light wave and $\lambda_1, \lambda_2$ are defined as first and second wavelengths which are multiplexed or demultiplexed.

The propagation constant difference $2 \cdot \Delta(\lambda)$, coupling coefficient $\kappa(\lambda)$ and length L are setup to simultaneously satisfy the following two conditions.

Namely, curved line x-y defined by equation (1) is tangent to points $(x(\lambda_1), y(\lambda_1))$ on an oval expressed by equation (2) and curved line x-y intersects points $(x(\lambda_2), y(\lambda_2))$ on a circle expressed by equation (3).

$$\begin{cases} x = \dfrac{\Delta(\lambda) \cdot L}{\pi} \\ y = \dfrac{\kappa(\lambda) \cdot L}{\pi} \end{cases} \quad (1)$$

$$x^2 + y^2 = 2y^2 \cdot \sin^2\left(\dfrac{\pi}{2} \cdot \sqrt{x^2 + y^2}\right) \quad (2)$$

$$x^2 + y^2 = (2m)^2, \ (m = 1, 2, 3 \ldots) \quad (3)$$

In the above-mentioned invention, when demultiplexing a light wave that was multiplexed, the light wave that was admitted from the upper end of the first waveguide is demultiplexed into a light wave of a first wavelength and a light wave of a second wavelength and than output from the second waveguide and the lower end of the first waveguide.

When multiplexing two light waves, the light wave of a second wavelength and the light wave of a first wavelength are admitted from each lower end of the first waveguide and the second waveguide and then the multiplexed light waves are output from the upper end of the first waveguide.

The principle of the present invention is described using the example shown in FIG. 2. FIG. 2 is a diagram that illustrates conditions which cause the directional couplers used in the above-mentioned optical multiplexer/demultiplexer to enter a cross state (state wherein a light wave admitted from one waveguide outputs from another waveguide) or a bar state (state wherein a light wave admitted from one waveguide outputs from the same waveguide).

In FIG. 2, open circle symbol and broken line indicate a bar state and the solid circle symbol and solid line indicate a cross state. The circular arc shown by the broken line represents equation (3) when m=1. The oval-shaped circular arc shown by the solid line represents equation (2).

The directional coupler type optical multiplexer/demultiplexer shown in FIG. 9 is designed such that the first wavelength band becomes point 21 and the second wavelength band becomes point 23 in FIG. 2. In contrast, as an example of the present invention, the first wavelength band (when $\lambda = \lambda_1$) of the above-mentioned x-y curved line 28 passes through point 23. Further, the second wavelength band (when $\lambda = \lambda_2$) of the x-y curved line 28 passes through point 24.

For this case, if wavelength $\lambda$ changes, point (x, y) will move along the straight line 27 in a conventional example. Moreover, point (x, y) will move on the x-y curved line 28 in the present invention.

Because the x-y curved line 28 is tangent to point 23 on the oval-shaped circular arc 25 that represents the cross state based on equation (2), a state close to the cross state can be realized in a wide range around the first wavelength band because of this, a widening the wavelength passing band in comparison to a conventional directional coupler type optical multiplexer/demultiplexer is possible. By means of this widened wavelength passing band, a plurality of wavelengths can be accommodated within the wavelength passing band. Even further, because the allowable errors of the passing wavelength are lessened, more allowable production errors can be obtained compared to a conventional directional coupler type optical multiplexer/demultiplexer making it possible to improve the producibility. In other words, an optical multiplexer/demultiplexer with a small amount of crosstalk between the light wave of a passing wavelength and a light wave of a blocking wavelength can be produced.

In addition, the present invention is comprised by only one directional coupler. In contrast, a conventional Mach- Zehnder interferometer type optical multiplexer/demultiplexer requires two or more directional couplers (3 [dB] couplers). Because of this, the present invention does not require excessively long waveguides making it possible to design smaller elements.

A composition has also been considered that sets the above-mentioned length L, propagation constant $2\cdot\Delta(\lambda)$, and coupling coefficient of the first and the second waveguides $\kappa(\lambda)$ such that the following two conditions are simultaneously satisfied.

Curved line x-y defined by equation (1) passes through (x, y)≈(0.8, 1) when the above-mentioned wavelength $\lambda=\lambda_1$. Further, the curved line x-y intersects points $(x(\lambda_2)\ y(\lambda_2))$ on a circle expressed by equation (3).

$$\begin{cases} x = \dfrac{\Delta(\lambda)\cdot L}{\pi} \\ y = \dfrac{\kappa(\lambda)\cdot L}{\pi} \end{cases} \quad (1)$$

$$x^2 + y^2 = (2m)^2, (m = 1, 2, 3 ...) \quad (3)$$

The principle of the present invention is described using the example shown in FIG. 2. For this case, the curved line x-y 28 is (x, y)≈(0.8, 1) when wavelength $\lambda=\lambda_1$ and almost passes through point 23. Further, when wavelength $\lambda=\lambda_2$, the curved line x-y 28 passes through point 24. If wavelength λ changes, point (x, y) will move on the curved line 28. Because the x-y curved line 28 is in a state tangent to point 23 on the oval-shaped circular arc 25 that represents the cross state based on equation (2), a state close to the cross state can be realized in a wide range around the first wavelength band.

Therefore, even when the propagation constant difference $2\cdot\Delta(\lambda)$, the coupling coefficient $\kappa(\lambda)$ and the coupling length L are set as described above, although the wavelength width in a state close to a cross state becomes somewhat narrower, effects almost identical the invention described above can be obtained together with a benefit of even simpler designs.

BRIEF DESCRIPTION OF THE DRAWINGS

FIG. 5(A) is a top view and

FIG. 5(B) is a cross section along line D—D of FIG. 5(A);

FIG. 6(A) is a top view and FIG. 6(B) is a cross section along line C—C of FIG. 6(A);

DESCRIPTION OF THE PREFERRED EMBODIMENTS

In the following, the present invention is described with reference to the attached drawings. FIG. 1(A) is a top view of an embodiment of the optical multiplexer/demultiplexer of the present invention. FIG. 1(B) is a cross section along line A—A of FIG. 1(A). FIG. 1(C) is a diagrammatic view showing the refractive index distribution on line B—B of FIG. 1(B).

Figure 1:
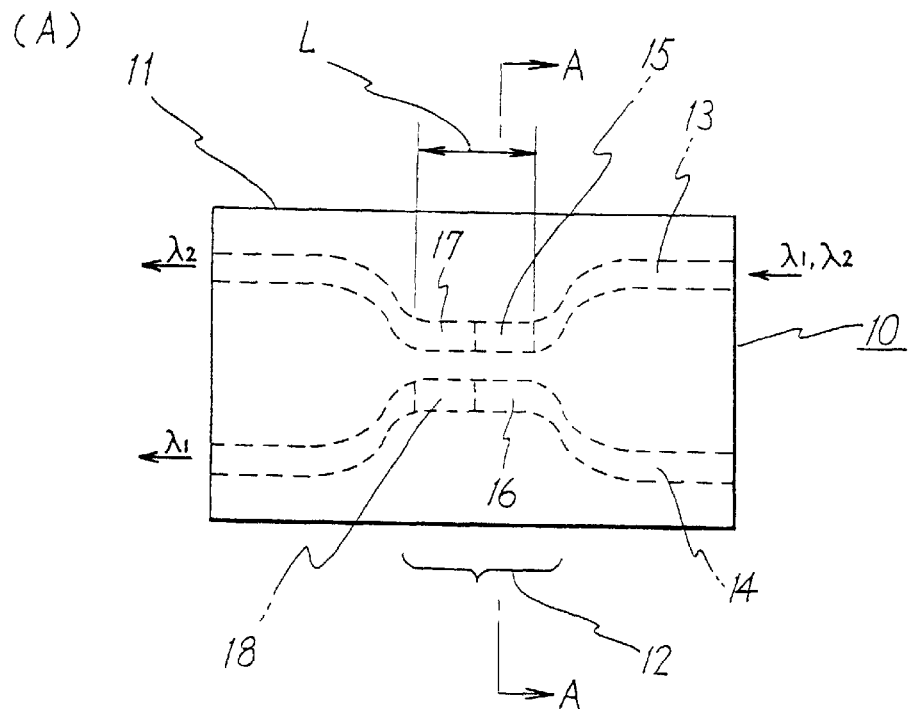
FIG. 1(A) is a top view of an optical multiplexer/demultiplexer.
FIG. 1(B) is a cross section along line A—A of FIG. 1(A).
FIG. 1(C) is a diagrammatic view showing the refractive index distribution on line B—B of FIG. 1(B)
Figure 1:
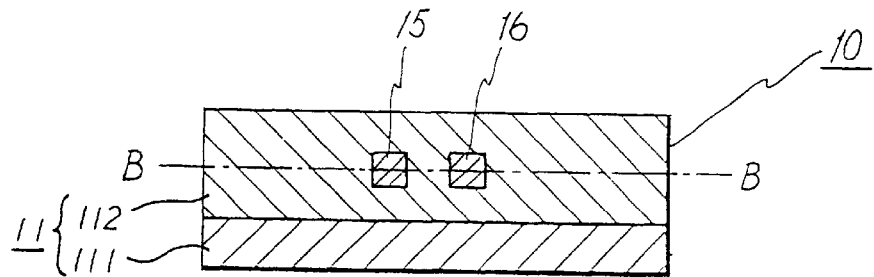
Figure 1:
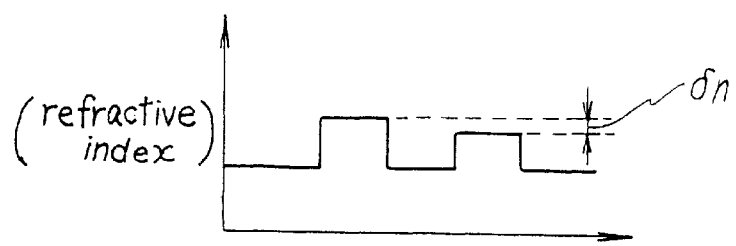

As shown in FIG. 1, the optical multiplexer/demultiplexer 10 comprises a substrate 11, a first waveguide 13 and a second waveguide 14 which propagate light waves. These waveguides 13, 14 excluding either of the ends, are embedded within the substrate. Further, a directional coupler 12 is formed by placing each portions of the first and second waveguides 13, 14 in close proximity to each other at a preselected length L (coupling length) up to a few microns. These waveguides have each of the portions at middle area.

During the demultiplex, this optical multiplexer/demultiplexer 10 admits a light wave (light wave wherein a first wavelength $\lambda_1$ and a second wavelength $\lambda_2$ are multiplexed) from the upper end (right side of FIG. 1(A)) of the first waveguide 13 while demultiplexing and then removes the light wave of the first wavelength $\lambda_1$ from the lower end (left side of FIG. 1(A)) of the first waveguide 13. Furthermore, simultaneous with the above action, the optical multiplexer/demultiplexer 10 removes the light wave of the second wavelength $\lambda_2$ from the lower end of the first waveguide 13.

In contrast, during the multiplex, the optical multiplexer/demultiplexer 10 admits the light wave of the second wavelength $\lambda_2$ from the lower end (left side of FIG. 1(A)) of the first waveguide 13 while demultiplexing and then simultaneously admits the light wave of the first wavelength $\lambda_1$ from the lower end (left side of FIG. 1(A)) of the second waveguide 14 while demultiplexing. Then, the optical multiplexer/demultiplexer 10 removes the multiplexed light wave from the upper end of the first waveguide 13.

Each of the portions of the first waveguide 13 and the second waveguide 14 which are in close proximity are bisected into an upper region and a lower region in the propagation direction of the light waves during demultiplexing. The propagation constant of the upper region 15 of the first waveguide 13 is set to be larger than the propagation constant of the upper region 16 of the second waveguide 14 by only $2\cdot\Delta(\lambda)$. The propagation constant of the lower region 18 of the second waveguide 14 is set to be larger than the propagation constant of the lower region 17 of the first waveguide 13 by only $2\cdot\Delta(\lambda)$. This propagation constant $2\cdot\Delta(\lambda)$ is a function of λ determined by means of the wavelength λ of the propagated light waves.

Even further, the coupling coefficient between the first waveguide 13 and the second waveguide 14 is set to $\kappa(\lambda)$ This coupling coefficient $\kappa(\lambda)$ is also a function of λ determined by means of the wavelength λ of the propagated light waves.

Hereupon, x, y are defined by the following equation as functions of the propagation constant difference $2\cdot\Delta(\lambda)$, the coupling coefficient $\kappa(\lambda)$ and the coupling length L.

$$x=\Delta(\lambda)\times L/\pi, y=\kappa(\lambda)\times L/\pi \qquad (1)$$

Figure 2:
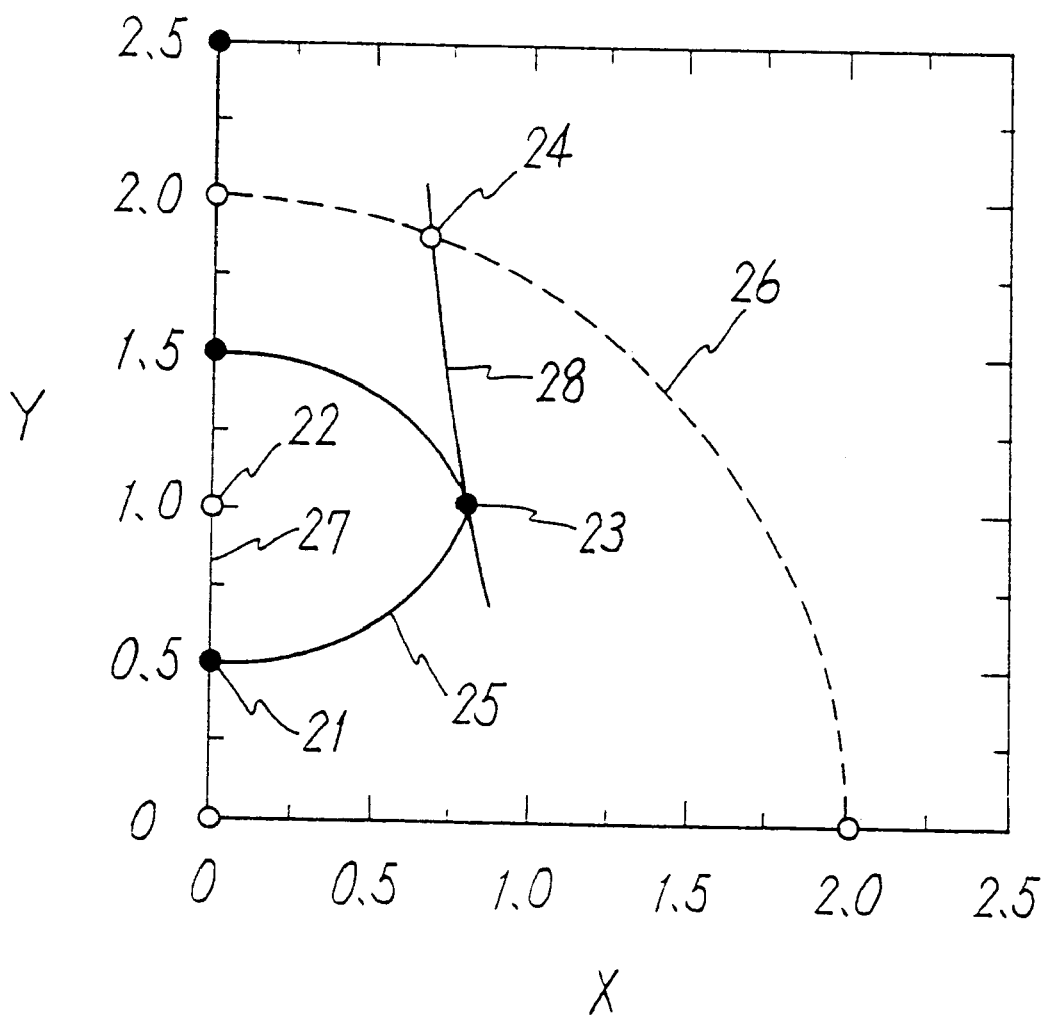
FIG. 2 is a diagrammatic view that describes the settings of the propagation constant difference and the coupling coefficient of the present invention and a conventional optical multiplexer/demultiplexer.

The x-y curved line 28 represented by this x, y is shown in FIG. 2. FIG. 2 shows the oval-shaped circular arc 25 that is represented by equation (2) and the circular arc 26 that is represented by equation (3).

$$x^2 + y^2 = 2y^2 \cdot \sin^2\left(\frac{\pi}{2}\cdot\sqrt{x^2+y^2}\right) \qquad (2)$$

$$x^2 + y^2 = (2m)^2, \ (m=1,2,3\ldots) \qquad (3)$$

Hereupon, the propagation constant difference $2\cdot\Delta(\lambda)$, the coupling coefficient $\kappa(\lambda)$ and the coupling length L are set to satisfy the following conditions.

Namely, as shown in FIG. 2, the oval-shaped circular arc 25 and the x-y curved line 28 make contact at point 23 of coordinate $(x(\lambda_1), y(\lambda_1))$.

Further, the circular arc 26 and the x-y curved line 28 intersect at point 24 of coordinate $(x(\lambda_2), y(\lambda_2))$ simultaneously.

Hereupon, it is preferable for natural number m expressed by equation (3) to be set within a range of m=1,2,3. In particular, it is preferable for m=1.

In the following, each portion will be described in detail.

As shown in FIG. 1, the substrate 11 comprises a silicon (Si) layer 111 and a quartz glass ($SiO_2$) clad layer 112 formed on the silicon layer. The first waveguide 13 and the second waveguide 14 each having a core width of approximately 6 [μm] are formed within this clad layer 112.

Each waveguide 13 and 14 is formed from quartz. The ratio of the difference in the refractive index between these waveguides 13, 14 and the clad layer 112 is approximately 0.35%. In order to prevent light loss between each waveguide 13 and 14 and the clad layer 112 due to the silicon layer 111, a distance on the order of 20 [μm] is maintained through the clad layer 112.

Furthermore, as shown in FIG. 1(C), the refractive index of the upper region 15 of the first waveguide 13 is set to be larger than the refractive index of the upper region 16 of the second waveguide 14 by only δn. Moreover, the refractive index of the lower region 18 of the second waveguide 14 is set to be larger than the refractive index of the lower region 17 of the first waveguide 13 by only δn.

The refractive index of each waveguide 13 and 14 is uniformly set throughout the entire body excluding the upper region 15 and the lower region 18.

Each waveguide 13 and 14 is in close proximity to each other close to the mid-point of the substrate 11 forming the directional coupler 12. The waveguide gap of this coupling portion (portions in close proximity) is set to 5.9 [μm], the coupling length L is set to 13.2 mm and the difference in the refractive index between the upper regions 15, 16 and the lower regions 17, 18 of each waveguide 13 and 14 is set to $7.9\times10^{-5}$. From these settings, the above-mentioned propagation constant difference $2\cdot\Delta(\lambda)$ and coupling coefficient $\kappa(\lambda)$ are solved utilizing an ordinary method.

Figure 3:
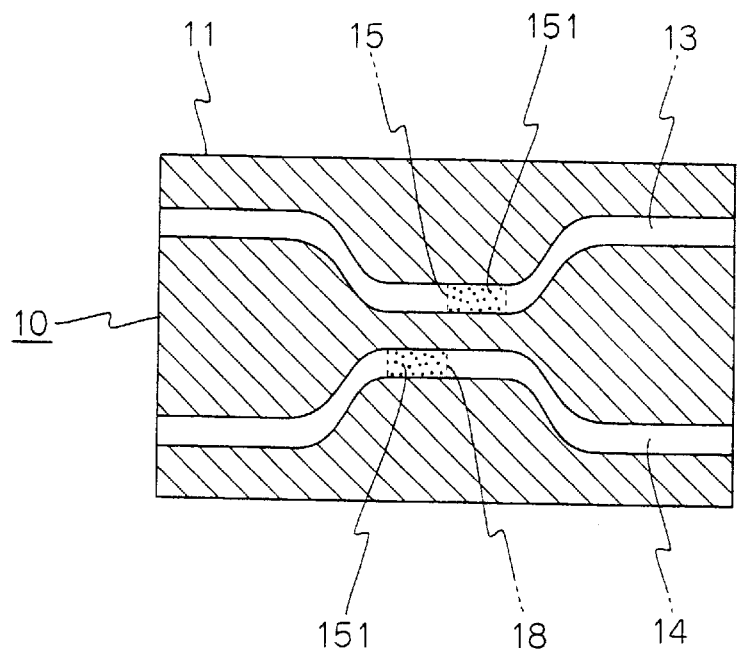
FIG. 3 is a explanatory drawing that describes a method to increase the refractive index of one portion of the waveguide.

Hereupon, as shown in FIG. 3, to increase the refractive index of the upper region 15 at the coupling portion of the first waveguide 13 and the lower region 18 of the second waveguide 14 higher than the refractive index of the other portions, a suitable quantity of dopant 151 (more than other portions) that raises the refractive index can be added to each waveguide 13, 14. This dopant can include germanium oxide ($GeO_2$), phosphorous oxide ($P_2O_5$), titanium oxide ($TiO_2$) or aluminum oxide ($Al_2O_3$).

Figure 4:
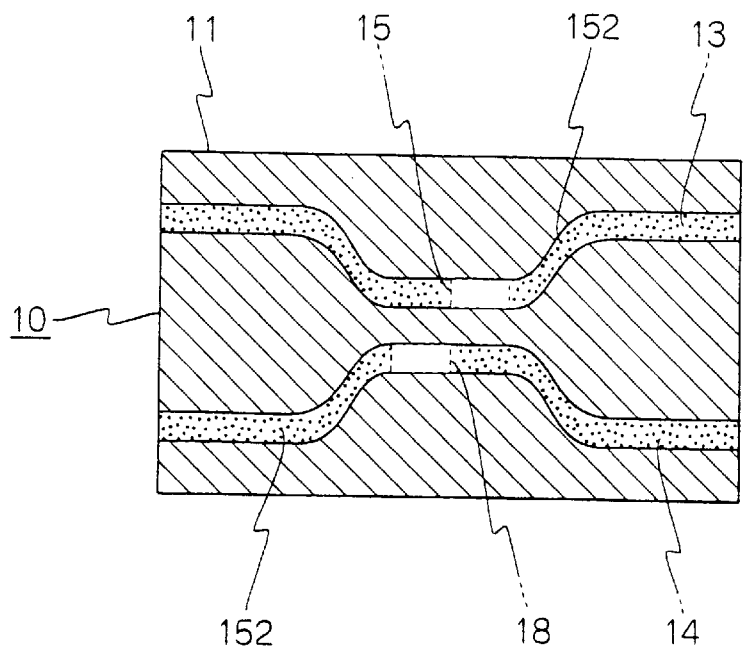
FIG. 4 is a explanatory drawing that describes another method to increase the refractive index of one portion of the waveguide.

Further, as shown in FIG. 4, excluding each region 15, 18, a dopant 152 that decreases the refractive index can be added to the other portions of each waveguide 13, 14. This dopant can include boric acid ($B_2O_3$) or fluorine (F). In addition, another method to raise the refractive index that can be taken is one in which a suitable amount of ultraviolet rays are irradiated on each region 15, 18 only.

Figure 5:
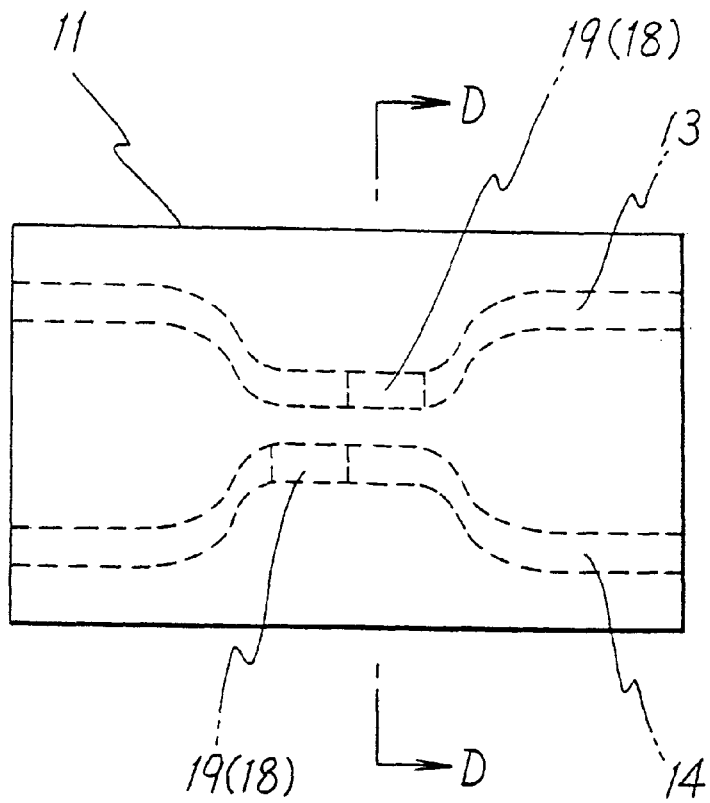
FIG. 5 is a explanatory drawing that describes a further method to increase the refractive index of one portion of the waveguide.
Figure 5:
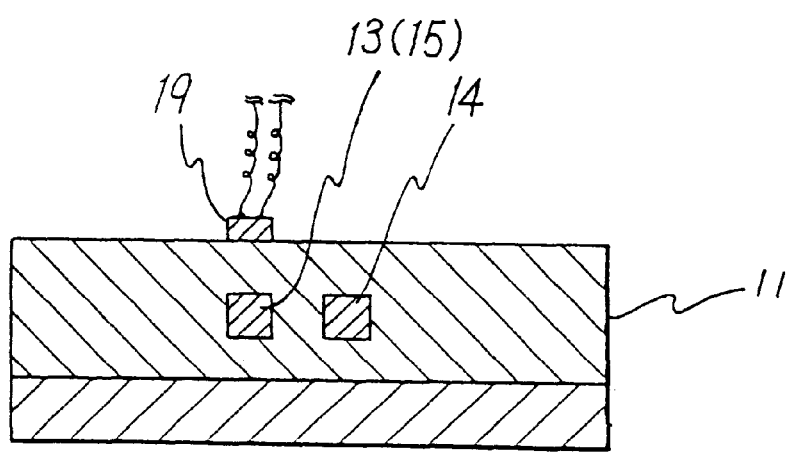

As shown in FIG. 5, the refractive index can be raised by utilizing the thermal effects of quartz glass to heat the upper region 15 and the lower region 18. For this case, a chrome (Cr) film 19 is prepared on the substrate 11 that corresponds to each upper region 15 and lower region 18. If a wire is attached to the chrome film 19 and electrical current allowed to flow through the wire, the chrome film will function as a heater allowing the upper region 15 and the lower region 18 to heat. In FIG. 5(A), the chrome film 19 and the upper region 15 and the lower region 18 are drawn overlapping.

By means of the above-mentioned actions, the refractive index of the upper region 15 and the lower region 18 grows larger and only the propagation constant difference $2\cdot\Delta(\lambda)$ is set larger than the other portions of each waveguide 13, 14.

Next, the operation of the optical multiplexer/demultiplexer 10 will be described using as an example an case in which a light wave of a first wavelength λ1 that is a wavelength band of 1.3 [μm] and a light wave of a second wavelength $\lambda_2$ that is a wavelength band of 1.55 [μm] are multiplexed and demultiplexed.

Figure 9:
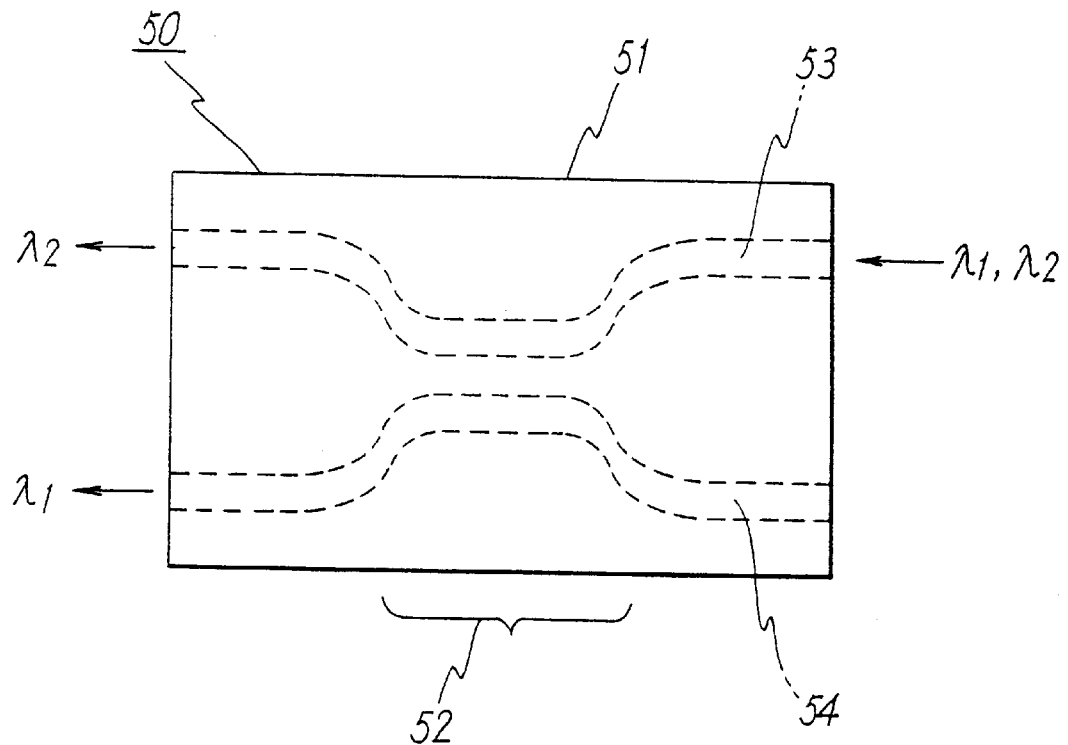
FIG. 9 is a top view showing a conventional optical multiplexer/demultiplexer.
Figure 10:
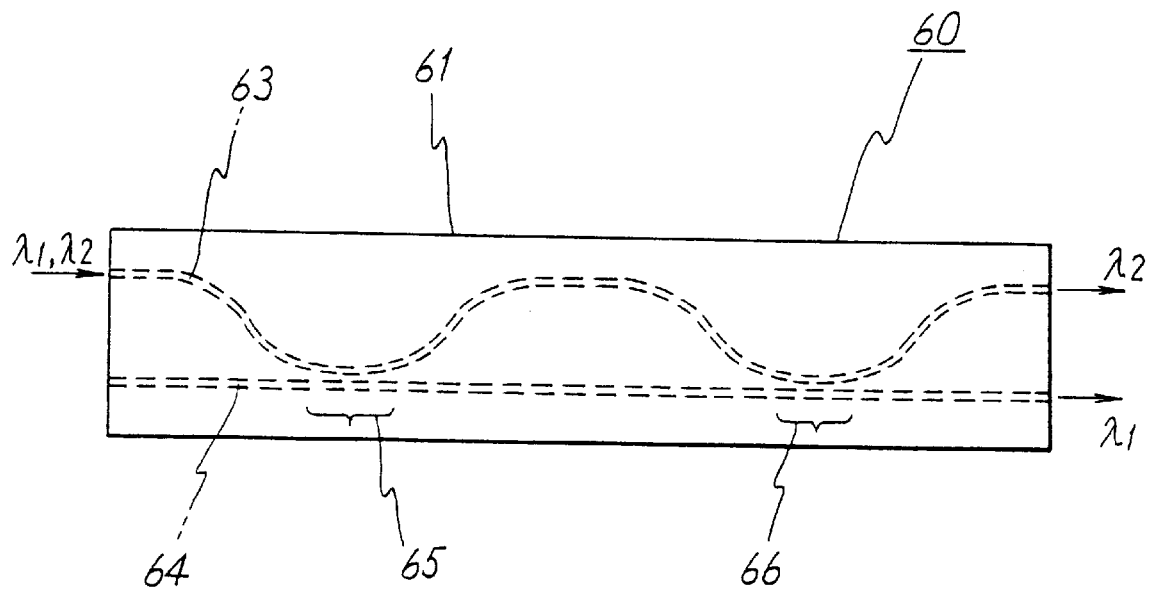
FIG. 10 is a top view showing another conventional optical multiplexer/demultiplexer.

The optical multiplexer/demultiplexer 10 will be described in comparison with the above-mentioned conventional optical multiplexer/demultiplexer shown in FIG. 9.

When x, y is defined by above-mentioned equation (1) for the conventional directional coupler type optical multiplexer/demultiplexer 50, the conditions which form a cross state are x=0 and y=m+0.5. Further, the conditions which form a bar state are given by the above-mentioned equation (3) in like manner to the optical multiplexer/demultiplexer 10. In contrast, the conditions which form a cross state or a bar state are as described above for the optical multiplexer/demultiplexer 10.

FIG. 2 shows the conditions that form a cross state or a bar state of these optical multiplexer/demultiplexers 10, 50.

In FIG. 2, the open circle symbol and the broken line of the circular arc 26 indicates a bar state and the solid circle symbol and the solid line of the oval-shaped circular arc 25 indicates a cross state.

Normally, when the wavelength λ grows larger, the sealing of the waveguide path becomes weaker. Because of this, the coupling coefficient $\kappa(\lambda)$ grows larger. Therefore, the conventional directional coupler type optical multiplexer/demultiplexer 50 is designed such that the wavelength band of 1.3 [μm] becomes point 21 and the wavelength band of 1.55 [μm] becomes point 22. If wavelength λ changes, point (x, y) will move along the straight line 27 based on the function of the directional coupler 52. However, the wavelengths which form a cross state and a bar state are only one point of each 1.3 [μm] band and 1.55 [μm] band thereby making the wavelength passing band narrow. Further, if the wavelength passing band narrows, the allowable production errors will also grow smaller.

Conversely, when the wavelength λ grows larger in the optical multiplexer/demultiplexer 10 of the present invention, the coupling coefficient $\kappa(\lambda)$ grows larger along with the propagation constant difference $\Delta(\lambda)$ growing smaller. The absolute value of the change in the coupling coefficient $\kappa(\lambda)$ due to changes in the wavelength λ is sufficiently large in comparison to the absolute value of the change in the propagation constant difference $2 \cdot \Delta(\lambda)$.

Therefore, if, for example, the state of the directional coupler is at point 23 at a certain wavelength, the state of the directional coupler will move in the direction of point 24 on the curved line 28 the larger the wavelength becomes. The optical multiplexer/demultiplexer 10 is designed such that the curved line 28 that connects points $(x(\lambda), y(\lambda))$ on the x-y coordinate that moves following changes in the wavelength $\lambda$ is tangent to point 23 on the oval-shaped circular arc 25 when the wavelength is the 1.3 [$\mu$m] band and intersects point 24 on the circular arc 26 when the wavelength is the 1.55 [$\mu$m] band.

Because of this, it is possible to attain a state close to a cross state within a wide wavelength range of 1.3 [$\mu$m]. In other words, in the optical multiplexer/demultiplexer 10, it is possible to widen the wavelength passing band because the wavelength passing band can be widened, the allowable production errors can also be increased in proportion to the applicable bandwidth. Therefore, the waveguide 10 is designed to have improved producibility. Moreover, differing from the Mach-Zehnder interferometer type optical multiplexer/demultiplexer, the optical multiplexer/demultiplexer 10 can be designed at smaller sizes because only one directional coupler is required.

Figure 6:
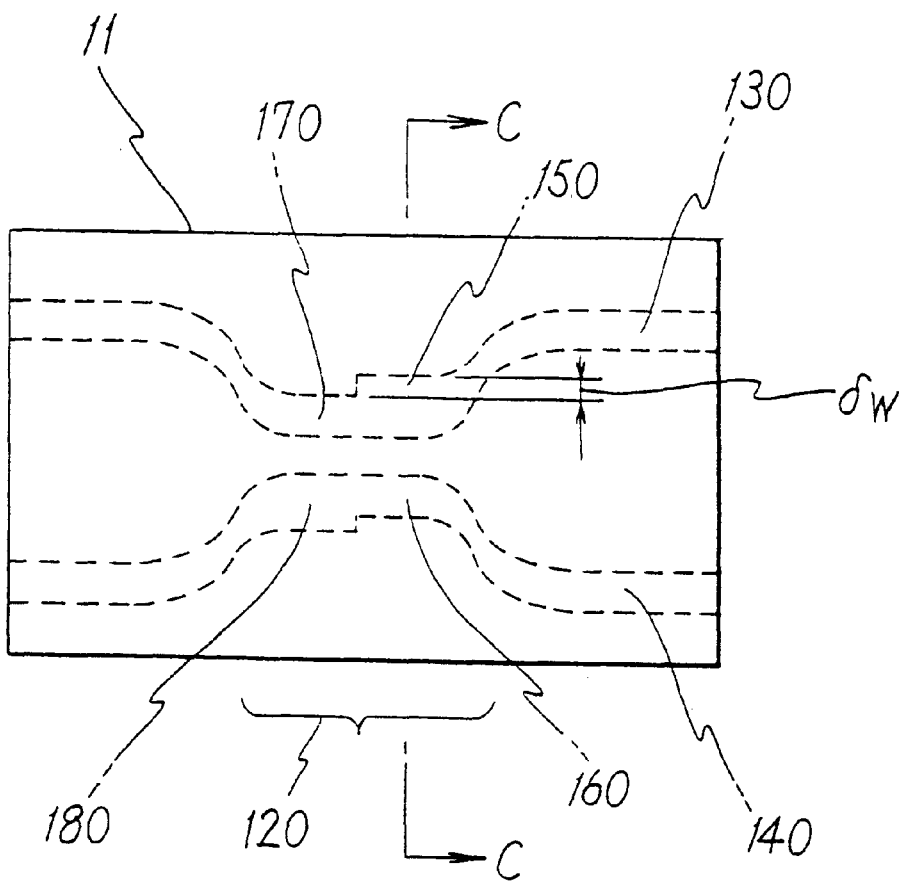
FIG. 6 shows an example of another directional coupler.
Figure 6:
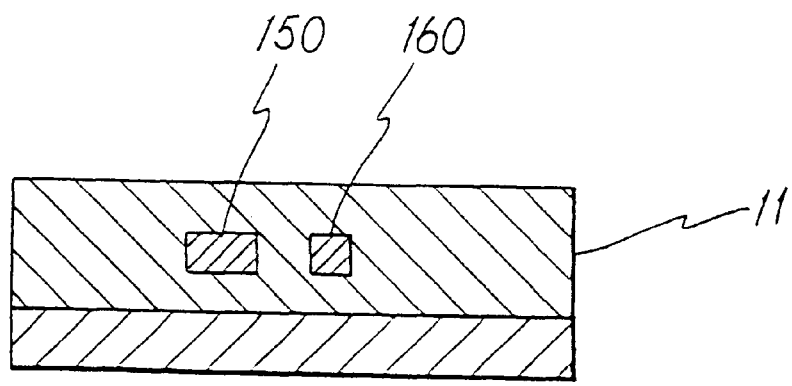

FIG. 6 shows an example of another directional coupler 120 different from the directional coupler 12. FIG. 6(A) is a top view of the directional coupler 120 and FIG. 6(B) is a cross sectional view. As shown in the figure, this directional coupler 120 is formed so the width of the upper region 150 of the first waveguide 130 is wider than the width of the upper region 160 of the second waveguide 140 by only $\delta$ w.

Simultaneous with the above, this directional coupler 120 is formed so the width of the lower region 180 of the second waveguide 140 is wider than the width of the lower region 170 of the first waveguide 140 by only $\delta$ w. By means of setting the difference $\delta$ w of this width to a suitable value, the propagation constant of the upper region 150 and the lower region 180 can be set higher than $2 \cdot \Delta(\lambda)$ of the other portions. This makes it possible to obtain effects similar to each above-mentioned waveguide 13, 14.

Figure 7:
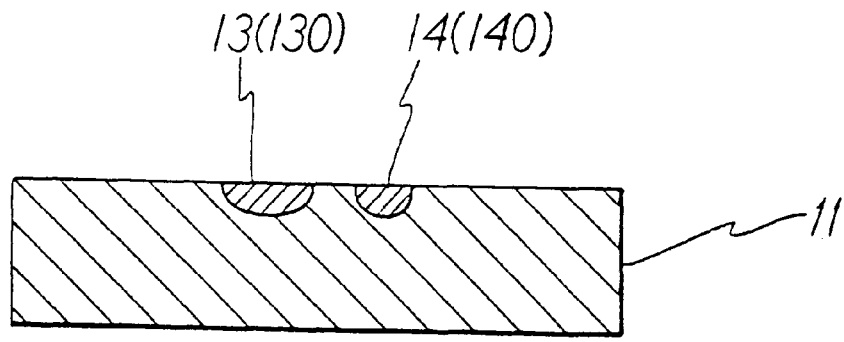
FIG. 7(A) and (B) are cross sections showing another shape of each waveguide.
Figure 7:
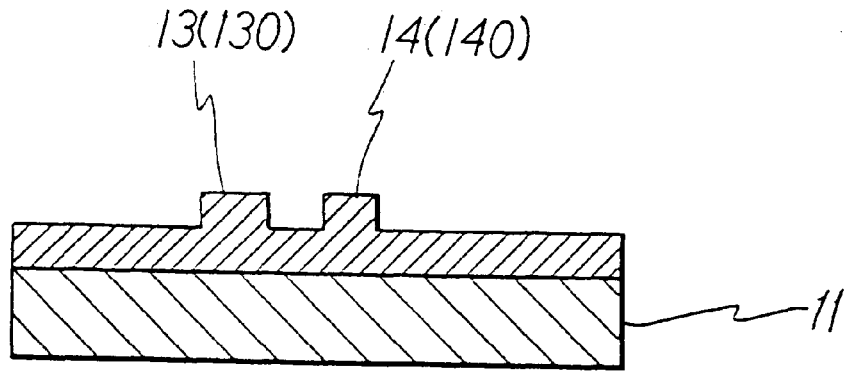

Furthermore, as shown in FIG. 1 and FIG. 3, each waveguide 13, 14, 130, 140 is an embedded type waveguide. However, a diffusion or ion exchange type waveguide as shown in the cross sectional view of FIG. 7(A) can be used or a ridge type waveguide or rib type waveguide as shown in the cross sectional view of FIG. 7(B) can be used.

Even further, if the material of the waveguides 13, 14, 130, 140 is a material that passes light wavelengths, a dielectric, semiconductor, crystal or glass can be used.

Moreover, for each element of the above-mentioned substrate 11 and each waveguide 13, 14, 130, 140, a substrate of silicon (Si) or glass or a quartz glass waveguide can be used. In addition, a substrate of lithium niobate (LiNbO$_3$) and a diffused titanium (Ti) waveguide or a proton exchange type waveguide can also be used. A substrate of glass and an ion exchange type waveguide can also be used. Even further, a semiconductor substrate and a semiconductor waveguide with a refractive index higher than this semiconductor can also be used.

The propagation constant difference $2 \cdot \Delta(\lambda)$, the coupling coefficient $\kappa(\lambda)$ and the length L can be set as shown below.

When wavelength $\lambda$ is the 1.3 [$\mu$m] band, the x-y curved line 28 based on equation (1) is x$\approx$0.8, y$\approx$1. At the same time, when wavelength $\lambda$ is the 1.55 [$\mu$m] band, the x-y curved line 28 intersects point 24 at the circle expressed by equation (3) of the above-mentioned bar state (see FIG. 2)

The definite settings for the dimensions, material quality and refractive index are the same as the above-mentioned settings. For the optical multiplexer/demultiplexer 10 comprised by the above-mentioned design values, the x-y values are x P 0.8, y P 1 for light in the wavelength band of 1.31 [$\mu$m]. Further, for light in the wavelength band of 1.56 [$\mu$m], the x-y curved line 28 intersects the circular arc 26. For this case, the curved line 28 and the oval-shaped circular arc 25 of equation (2) that represents a cross state are not accurately tangent. Because of this, the wavelength width in a state close to a cross state in the wavelength band of 1.3 [$\mu$m] becomes slightly narrower than the case when it is tangent to point 23.

However, because the curved line 28 is almost parallel to the y-axis, a state close to a cross state can be obtained with a wide wavelength width if compared to the conventional optical multiplexer/demultiplexer 50. Therefore, there is a benefit of the design of the optical multiplexer/demultiplexer 10 becoming even more simple.

Figure 8:
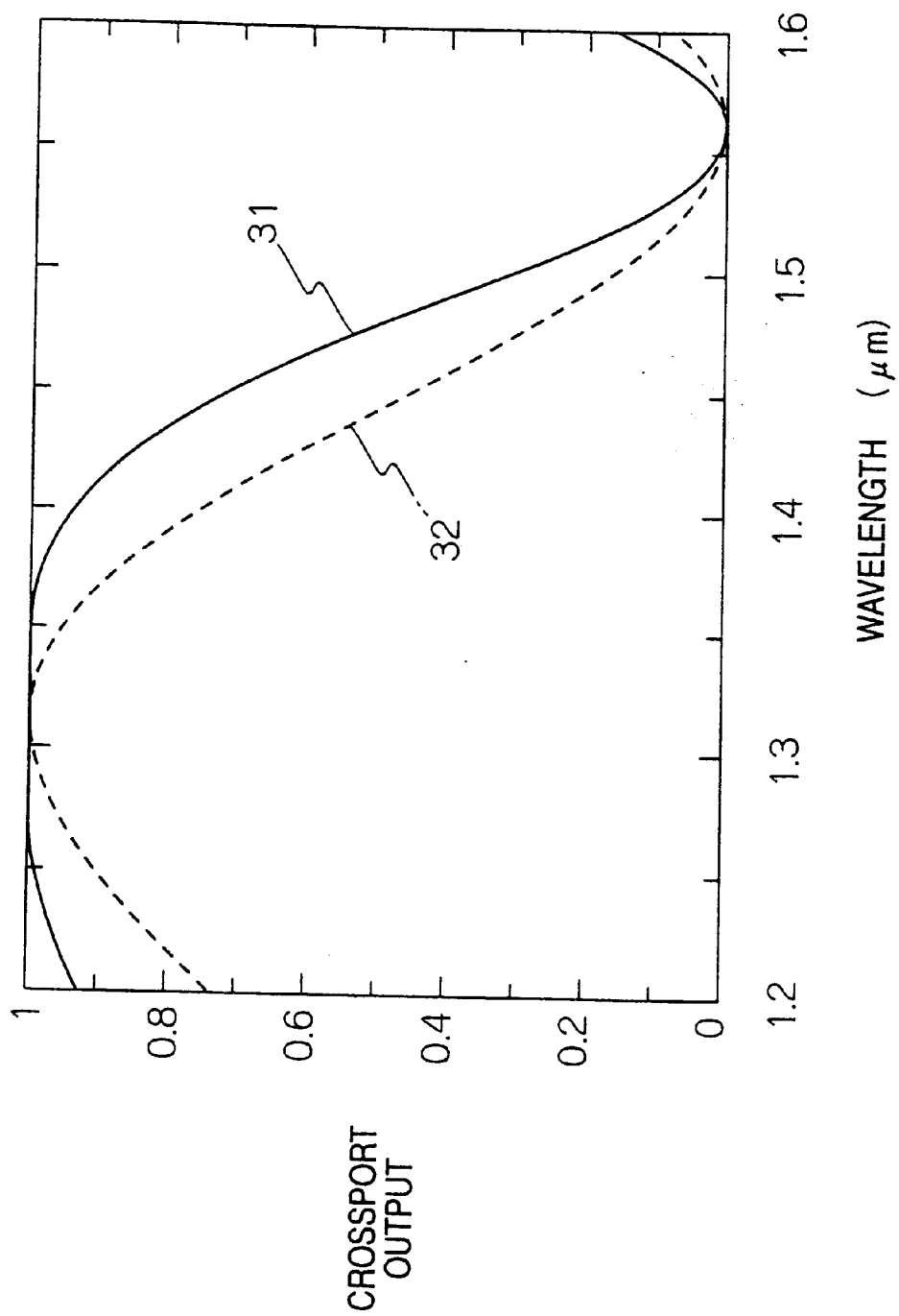
FIG. 8 is a diagrammatic view showing the wavelength characteristics of the present invention and a conventional optical multiplexer/demultiplexer.

The calculated values of the output characteristics of the cross port (left edge of the waveguide 14 of FIG. 1) of the optical multiplexer/demultiplexer 10 based on the above-mentioned settings are indicated by the solid line 31 in FIG. 8. Furthermore, as a comparative example, the output characteristics of the cross port of the optical multiplexer/demultiplexer 50 are indicated by the broken line 32 in FIG. 8. Even further, in the optical multiplexer/demultiplexer 50, the gap of the coupling portion is set to 6.5 [$\mu$m] and the coupling length is set to 8.9 mm using embedded quartz waveguides 53, 54 having a core width of 6 [$\mu$m] and a ratio of the difference in the refractive index between the waveguide and the cladding of 0.35%.

It is understood that the wavelength characteristics 31 of the optical multiplexer/demultiplexer 10 can obtain a state close to a cross state within a wide wavelength range wider than the 1.3 [$\mu$m] band compared to the wavelength characteristics 32 of the optical multiplexer/demultiplexer 50.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-161670 (Filed on Jun. 18th, 1997) including specification, claims, drawings and summary are incorporated herein by reference in its entirety.

What is claimed is:

1. An optical multiplexer/demultiplexer comprising:
   a substrate formed from a material with a uniform refractive index;
   a first and a second waveguide which are mounted to the substrate and are formed from a material with a refractive index higher than the substrate; and
   a directional coupler that is formed by placing each portions the first and second waveguides in close proximity to each other at a preselected length;
   wherein, each of the portions of said first and second waveguides are bisected into an upper region and a lower region in the one direction the light waves propagate; and
   the propagation constant of the upper region of said first waveguide is set to be higher than the other portion and the propagation constant of the lower region of said second waveguide is set to be higher than the other portion.

2. An optical multiplexer/demultiplexer comprising:

a substrate formed from a material with a uniform refractive index;

a first and a second waveguide which are mounted to the substrate and are formed from a material with a refractive index higher than the substrate; and a directional coupler that is formed by placing each portions of the first and second waveguides in close proximity to each other at a preselected length;

wherein each of the portions of said first and second waveguides are bisected into an upper region and a lower region in the one direction the light waves propagate;

the propagation constant of the upper region of said first waveguide is set to be higher than the other portion and the propagation constant of the lower region of said second waveguide is set to be higher than the other portion and furthermore;

given L is length of said portions which are in close proximity, $2\cdot\Delta(\lambda)$ is the propagation constant difference between the portion of the upper region of said first waveguide and other portions of said first waveguide, $2\cdot\Delta(\lambda)$ is also the propagation constant difference between the portion of the lower region of said second waveguide and other portions of said second waveguide, and $\kappa(\lambda)$ is the coupling coefficient of said first and said second waveguides, then $\lambda$ is defined as the wavelength of the incident light wave and $\lambda_1, \lambda_2$ are defined as first and second wavelengths which are multiplexed or demultiplexed;

said propagation constant difference $2\cdot\Delta(\lambda)$, coupling coefficient $\kappa(\lambda)$ and length L are setup to simultaneously satisfy the following two conditions;

curved line x-y defined by equation (1) is tangent to points $(x(\lambda_1), y(\lambda_1))$ on an oval expressed by equation (2); and said curved line x-y intersects points $(x(\lambda_2), y(\lambda_2))$ on a circle expressed by equation (3).

$$\begin{cases} x = \frac{\Delta(\lambda)\cdot L}{\pi} \\ y = \frac{\kappa(\lambda)\cdot L}{\pi} \end{cases} \qquad (1)$$

$$x^2 + y^2 = 2y^2 \cdot \sin^2\left(\frac{\pi}{2} \cdot \sqrt{x^2+y^2}\right) \qquad (2)$$

$$x^2 + y^2 = (2m)^2, (m = 1, 2, 3 \ldots) \qquad (3)$$

3. An optical multiplexer/demultiplexer comprising:

a substrate formed from a material with a uniform refractive index;

a first and a second waveguide which are mounted to this substrate and are formed from a material with a refractive index higher than the substrate;

a directional coupler that is formed by placing each portions of between the first and second waveguides in close proximity to each other at a fixed length;

each of the portions of said first and second waveguides which are in close proximity are bisected into an upper region and a lower region in the one direction the light waves propagate;

the propagation constant of the upper region of said first waveguide is set to be higher than the other portion and the propagation constant of the lower region of said second waveguide is set to be higher than the other portion and furthermore;

given L is length of said portions which are in close proximity, $2\cdot\Delta(\lambda)$ is the propagation constant difference between the portions of the upper region of said first waveguide and other portions of said first waveguide, $2\cdot\Delta(\lambda)$ is also the propagation constant difference between the portions of the lower region of said second waveguide and other portions of said second waveguide, and $\kappa(\lambda)$ is the coupling coefficient of said first and said second waveguides, then $\lambda$ is defined as the wavelength of the incident light wave and $\lambda_1, \lambda_2$ are defined as first and second wavelengths which are multiplexed or demultiplexed;

said propagation constant difference $2\cdot\Delta(\lambda)$, coupling coefficient $\kappa(\lambda)$ and length L are setup to simultaneously satisfy the following two conditions;

curved line x-y defined by equation (1) passes through $(x, y)\approx(0.8, 1)$ when said wavelength $\lambda=\lambda_1$; and said curved line x-y intersects points $(x(\lambda_2), y(\lambda_2))$ on a circle expressed by equation (3).

$$\begin{cases} x = \frac{\Delta(\lambda)\cdot L}{\pi} \\ y = \frac{\kappa(\lambda)\cdot L}{\pi} \end{cases} \qquad (1)$$

$$x^2 + y^2 = (2m)^2, (m = 1, 2, 3 \ldots) \qquad (3)$$

4. The optical multiplexer/demultiplexer according to claim 2, wherein said waveguides, excluding both ends, are embedded in said substrate.

5. The optical multiplexer/demultiplexer according to claim 2, wherein said substrate is formed from silicon (Si) and said first and second waveguides are formed from quartz glass.

6. The optical multiplexer/demultiplexer according to claim 2, wherein said substrate is formed from glass and said first and second waveguides are formed from quartz glass.

7. The optical multiplexer/demultiplexer according to claim 2, wherein said substrate is formed from lithium niobate (LiNbO$_3$) and said first and second waveguides are diffused titanium (Ti) waveguides.

8. The optical multiplexer/demultiplexer according to claim 2, wherein said substrate is formed from lithium niobate (LiNbO$_3$) and said first and second waveguides are proton exchange waveguides.

9. The optical multiplexer/demultiplexer according to claim 2, wherein said substrate is formed from glass and said first and second waveguides are ion exchange waveguides.

10. The optical multiplexer/demultiplexer according to claim 2, wherein said substrate is formed from silicon (Si) and said first and second waveguides are ridge type waveguides.

11. The optical multiplexer/demultiplexer according to claim 2, wherein said substrate is formed from silicon (Si) and said first and second waveguides are rib type waveguides.

12. The optical multiplexer/demultiplexer according to claim 2, wherein said substrate is formed from semiconductor and said first and second waveguides are formed from semiconductor with a refractive index higher than said semiconductor.

13. The optical multiplexer/demultiplexer according to claim 2, wherein the refractive index of only the upper region of said first waveguide and the lower region of said second waveguide is set higher than other portions of each waveguide.

14. The optical multiplexer/demultiplexer according to claim 13, wherein only the upper region of said first waveguide and the lower region of said second waveguide are formed from a material with an refractive index higher than other portions of each waveguide.

15. The optical multiplexer/demultiplexer according to claim 2, wherein the width of the upper region of said first waveguide and the lower region of said second waveguide is broadened.

16. The optical multiplexer/demultiplexer according to claim 2, wherein a heater is disposed on said substrate to heat the upper region of said first waveguide and the lower region of said second waveguide.

17. The optical multiplexer/demultiplexer according to claim 3, wherein the ratio of the difference in the refractive index of said substrate to each said waveguide is 0.35 [%] and the difference in the refractive index between the upper region of said first waveguide and the lower region of said second waveguide and the other portions of each waveguide is set to $7.9 \times 10^{-5}$.

18. The optical multiplexer/demultiplexer according to claim 17, wherein the width of each said waveguide is 6 [$\mu$m], the gap of each of the portions of said waveguides which are in close proximity is 5.9 [$\mu$m] and the length L of said portions which are in close proximity is set to 13.2 [mm].

19. The optical multiplexer/demultiplexer according to claim 18, wherein said waveguides, excluding both ends, are embedded in said substrate.

20. The optical multiplexer/demultiplexer according to claim 19, wherein said substrate is formed from silicon (Si) and said first and second waveguides are quartz waveguides.

21. The optical multiplexer/demultiplexer according to claim 18, wherein said first wavelength $\lambda_1$ that is multiplexed or demultiplexed≈1.3 [$\mu$m] and said second first wavelength $\lambda_2$ that is multiplexed or demultiplexed≈1.55 [$\mu$m].

22. The optical multiplexer/demultiplexer according to claim 21, wherein a dopant that increases the refractive index is added to each said waveguide with the refractive index being set by the quantity of the dopant added.

23. The optical multiplexer/demultiplexer according to claim 22, wherein a larger quantity of said dopant is added to only the upper region of said first waveguide and the lower region of said second waveguide than to the other portions of said waveguides.

24. The optical multiplexer/demultiplexer according to claim 23, wherein said dopant is germanium oxide ($GeO_2$).

* * * * *